United States Patent [19]
Hintukainen

[11] Patent Number: 5,969,550
[45] Date of Patent: Oct. 19, 1999

[54] METHOD AND APPARATUS FOR MUTUAL SYNCHRONIZATION OF ASIC DEVICES

[75] Inventor: Kari Hintukainen, Norsborg, Sweden

[73] Assignee: Telefonkatiebolaget LM Ericsson, Stockholm, Sweden

[21] Appl. No.: 08/930,266

[22] PCT Filed: Mar. 27, 1996

[86] PCT No.: PCT/SE96/00392

§ 371 Date: Nov. 26, 1997

§ 102(e) Date: Nov. 26, 1997

[87] PCT Pub. No.: WO96/30820

PCT Pub. Date: Oct. 3, 1996

[30] Foreign Application Priority Data

Mar. 31, 1995 [SE] Sweden .................................. 9501176

[51] Int. Cl.[6] ...................................................... H03L 7/00
[52] U.S. Cl. ............................. 327/145; 327/146; 327/295
[58] Field of Search .................................... 327/144, 141, 327/145, 146, 295, 99, 407, 294, 297

[56] References Cited

U.S. PATENT DOCUMENTS

| 4,771,441 | 9/1988 | Spengler et al. | 375/106 |
|---|---|---|---|
| 4,772,937 | 9/1988 | Romesburg et al. | 358/19 |
| 4,797,574 | 1/1989 | Okubo et al. | 307/269 |
| 4,864,399 | 9/1989 | Romesburg et al. | 358/148 |
| 4,928,290 | 5/1990 | Vo | 375/118 |
| 5,120,989 | 6/1992 | Johnson et al. | 307/269 |
| 5,317,601 | 5/1994 | Riordan et al. | 375/107 |
| 5,359,232 | 10/1994 | Eitrheim et al. | 307/268 |
| 5,361,290 | 11/1994 | Akiyama | 377/47 |
| 5,367,207 | 11/1994 | Goetting et al. | 307/465 |
| 5,416,918 | 5/1995 | Gleason et al. | 395/550 |
| 5,555,213 | 9/1996 | DeLong | 326/93 |
| 5,638,015 | 6/1997 | Gujral et al. | 327/144 |

FOREIGN PATENT DOCUMENTS

| 0 313 337A2 | 4/1989 | European Pat. Off. . |
|---|---|---|
| 0 375 794 A1 | 7/1990 | European Pat. Off. . |
| 0 403 093A2 | 12/1990 | European Pat. Off. . |
| 0 506 595A1 | 9/1992 | European Pat. Off. . |
| 0 683 448A1 | 11/1995 | European Pat. Off. . |

*Primary Examiner*—Kenneth B. Wells
*Assistant Examiner*—Hai L. Nguyen
*Attorney, Agent, or Firm*—Burns, Doane, Swecker & Mathis, L.L.P.

[57] ABSTRACT

A method and apparatus are provided for synchronizing communications between different integrated circuits having different individual clock rates. In accordance with exemplary embodiments of the invention, a common clock signal is provided having a frequency greater than or equal to the highest individual clock rate, and the common clock signal is divided to obtain individual clock signals for the different integrated circuits For each integrated circuit an arrangement including a switching device and an edge-triggered storage member is also provided. The arrangement has an input for receiving signals, for example from the other integrated circuits. The arrangement also has an output connected to an input of the integrated circuit. The common clock signal and the individual clock signal corresponding to the integrated circuit are provided to the arrangement. The switching device in the arrangement alternately connects an input of the edge-triggered storage member to one of the arrangement input and the arrangement output, based on a state of the individual clock signal. An output of the edge-triggered storage member functions as the arrangement output. The common clock signal is provided to an edge trigger of the storage member so that on an edge of the common clock signal, the storage member will store a signal present at the storage member input and then provide the currently stored signal at the storage member output.

4 Claims, 3 Drawing Sheets

METHOD AND APPARATUS FOR MUTUAL SYNCHRONIZATION OF ASIC DEVICES

The present invention concerns a process and arrangement for the mutual synchronization of application-specific integrated circuits (ASIC) arranged to communicate with one another.

TECHNICAL BACKGROUND

In the field of telecommunications, inter alia, digital systems are found which consist of several different application-specific integrated circuits which often cooperate in such a way that data has to be transmitted between the different circuits.

Each operation or change of state in an integrated circuit is initiated by a clock signal which can be generated in the circuit or can be input into the circuit from a clock disposed externally thereof. It is important that the parts of an integrated circuit which are interdependent or communicate with one another in some way are synchronized in terms of time. This synchronization is brought about by the clock signal which has to be distributed such that clock skew between clock signals in the different parts of the integrated circuit is minimized.

In the case of a digital system comprising a plurality of application-specific integrated circuits (ASIC), all the changes of state or operations in the system are controlled by clock signals which correspond to the circuits and are usually generated locally in connection with the respective circuit. In the same way as for different parts of an integrated circuit, it is important that different integrated circuits in a digital system are synchronized in terms of time if these circuits are arranged to exchange data. In the case of a system with a plurality of integrated circuits cooperating with one another there should therefore be correspondance between clock signals belonging to respective circuits. If this is not the case, clock skew can occur between clock signals in the different circuits in the system which leads to problems when data is exchanged therebetween.

U.S. Pat. No. 5,317,601 earlier disclosed a technique for feeding synchronized clock signals at different frequencies to a number of different parts of an integrated circuit. A number of synchronized clock signals are generated and distributed to the different parts of the circuit. In order to improve control of clock skew between these synchronized clock signals a synchronizing signal is also generated and is used as a reference for the clock signal. This synchronizing signal is distributed to the different parts of the integrated circuit. A synchronizing circuit adapted to each part of the integrated circuit receives the clock signals and the synchronizing signal.

The synchronizing circuit essentially comprises a multiplexer which through-connects the clock signal to the intended part of the integrated circuit under the control of the synchronizing signal. Each synchronizing circuit therefore synchronizes the respective clock signal according to the synchronizing signal.

The known synchronizing circuit consequently overcomes the problem of reducing skew between synchronizing signals to different parts of an integrated circuit. However the solution can be inadequate when data is exchanged between these parts.

DESCRIPTION OF THE INVENTION

The object of the present invention is to solve the problem of improving synchronization between integrated circuits which communicate with one another.

This object is achieved for respective integrated circuits by means of an arrangement and a process whereby an activating pulse edge in a common clock signal to an edge-triggered integrated circuit can be determined. The integrated circuit is arranged to communicate with at least one further integrated circuit. Each of the circuits which are arranged to communicate with one another, receives the common clock signal. The different integrated circuits are also arranged to receive frequency data in the form of a clock signal which is adapted to the respective circuit and which is used for establishing in the respective integrated circuit an activating pulse edge in the common clock signal.

The arrangement according to the invention comprises a switching device and an edge-triggered storage member. The switching device is arranged to receive a clock signal which is adapted to the integrated circuit and which has a lower frequency than the common clock signal. The storage member is in turn arranged to receive an output signal from the switching device which can change between a first and a second state depending on the clock signal adapted to the integrated circuit. In the fist state of the switching device an input signal from a second integrated circuit with which the integrated circuit communicates is through-connected. In the second state of the switching device an output signal from the storage member is fed back through the switching device and back to the same storage member.

PREFERRED EMBODIMENT

Figure 2:
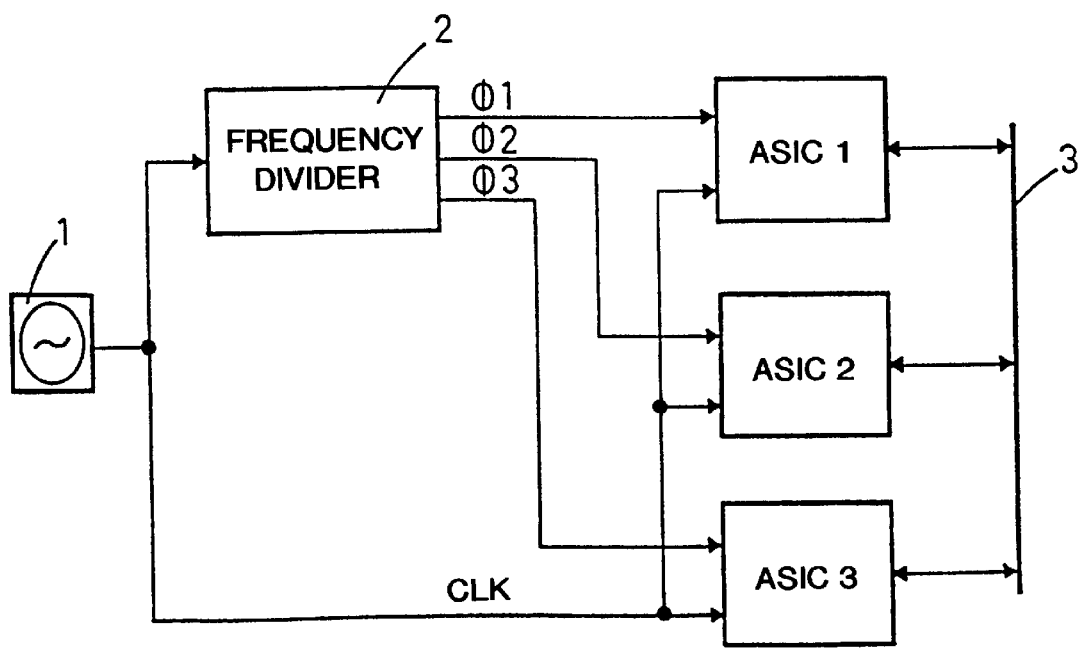
FIG. 2 shows three application-specific integrated circuits which receive a common clock signal.
Figure 4:
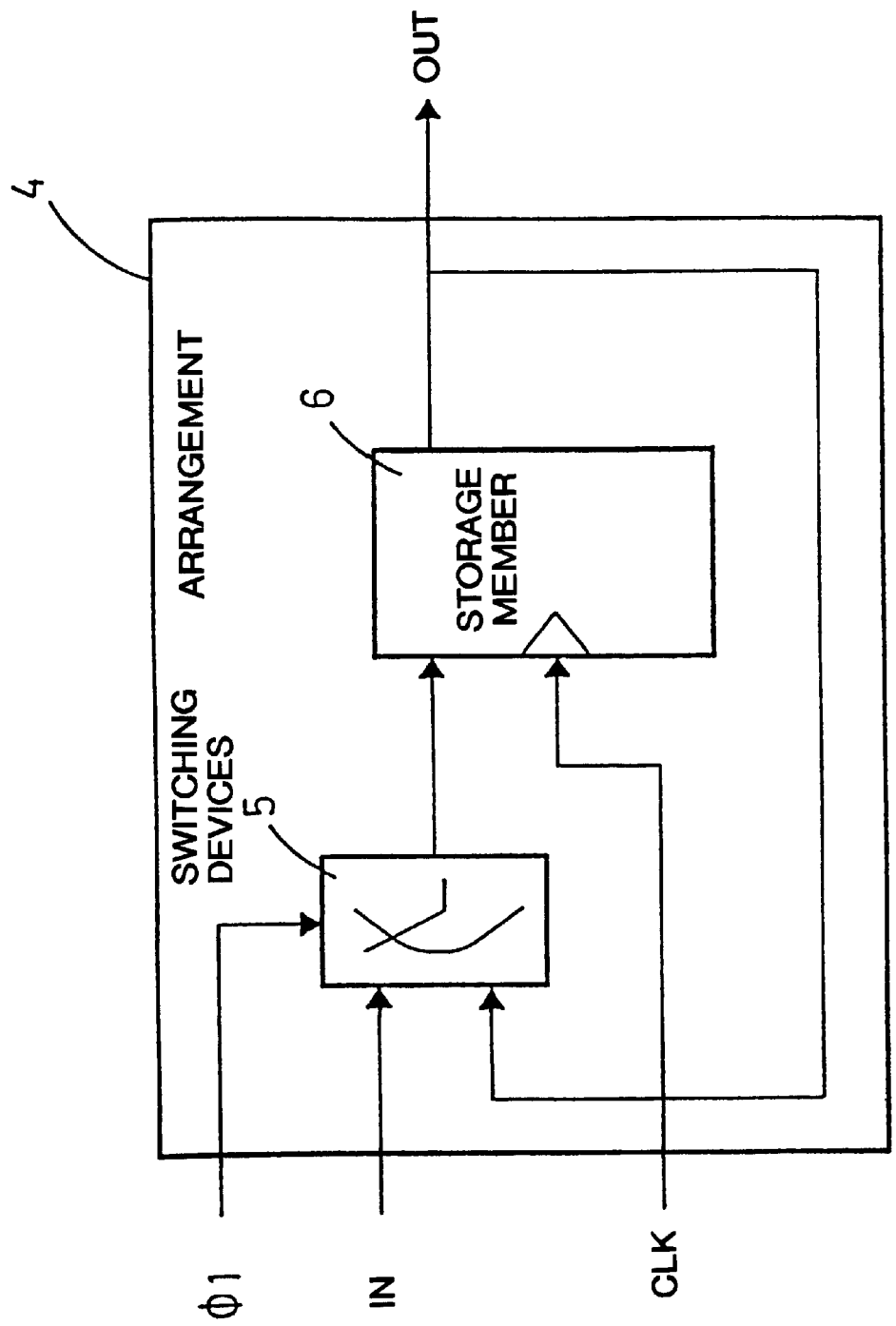
FIG. 4 shows the arrangement according to the invention.

In the following the invention will be explained in greater detail with reference to the Figures and in particular FIGS. 2 and 4, FIG. 2 showing a digital system in the case of which a common clock signal CLK is coupled into a plurality of application-specific integrated circuits ASIC1, ASIC2, ASIC3, and FIG. 4 showing an arrangement in the case of which an activating pulse edge in the common clock signal CLK can be determined for the respective integrated circuit.

Figure 1:
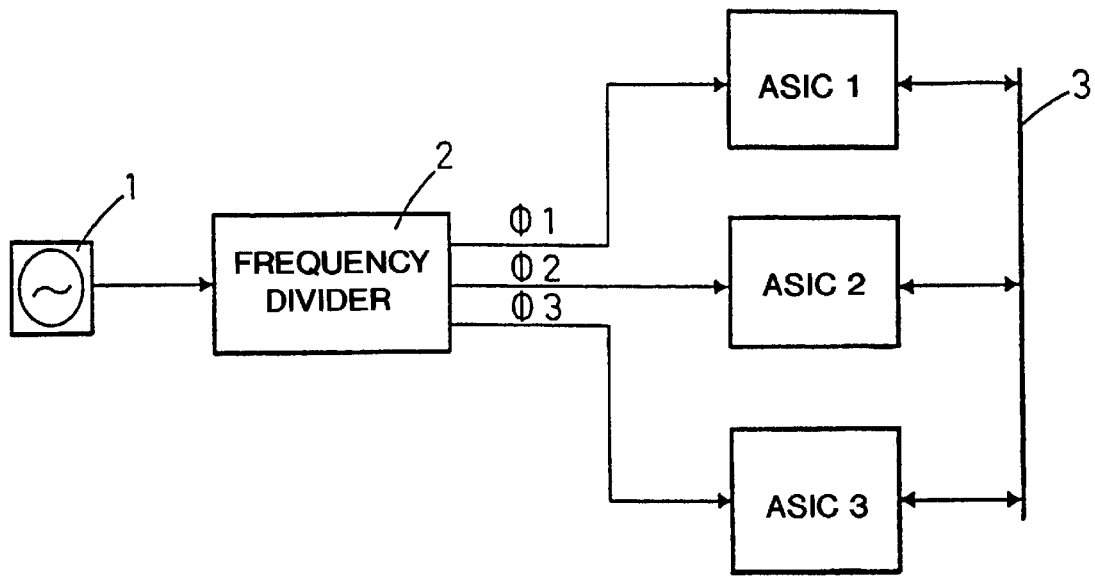
FIG. 1 shows three application-specific integrated circuits with separate clock signals.

FIG. 1 shows a system according to the prior art. The system comprises means 1 for generating a common clock frequency. As the Figure shorts, the clock frequencies $\phi 1$, $\phi 2$, $\phi 3$ adapted to the respective circuit can be generated from the common clock signal CLK by means of a frequency divider 2. Each of the application-specific integrated circuits ASIC1, ASIC2, ASIC3 shown in the Figures receives the clock signal $\phi 1$, $\phi 2$, $\phi 3$ adapted to the respective circuit. However with the solution shown problems arise when data has to be exchanged between the integrated circuits ASIC1, ASIC2, ASIC3. As a result of delays in the frequency divider 2, for example, differences in synchronization can occur between the clock signals $\phi 1$, $\phi 2$, $\phi 3$ in the respective integrated circuits, i.e. problem with clock skew occur when data is exchanged between the circuits.

The arrangement according to the invention is intended for clock pulse distribution according to FIG. 2. A common clock signal CLK is generated and transmitted to a frequency divider 2 which generates three new clock signals $\phi 1$, $\phi 2$, $\phi 3$ from the common clock signal CLK. These three new clock signals are adapted to the requirement in the respective application-specific integrated circuit ASIC1, ASIC2, ASIC3. However each of the application-specific integrated circuits also receives the common clock signal CLK which is transmitted with a minimum relative delay to each of the integrated circuits. Each integrated circuit ASIC1, ASIC2, ASIC3 thus receives two different clock signals at different frequencies. The integrated circuits are arranged to communicate with one other, which is shown in the Figures by the connection from each of the circuits to a common databus 3.

Figure 3:
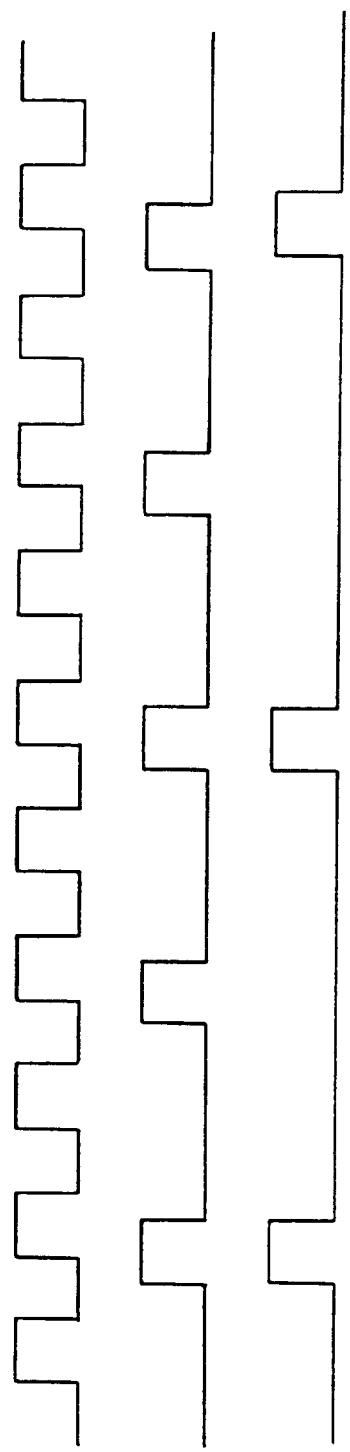
FIG. 3 shows some examples of clock signals.

FIG. 3 shows an example of a common clock signal CLK, a first clock signal φ1 which is adapted to a first integrated circuit ASIC1 and a second clock signal φ2 which is adapted to a second integrated circuit ASIC2. The first and second clock signals φ1, φ2 are generated from the common clock signal CLK. The Figure shows the situation at the input of the first integrated circuit ASIC1 and at the input of the second integrated circuit ASIC2. As the Figure clearly shows, a given delay has occurred in the first clock signal φ1 and in the second clock signal φ2 in relation to the common clock signal CLK. Both the first and the second clock signals are consequently phase-shifted relative to the common clock signal CLK. A given delay has also occurred between the first clock signal φ1 and the second clock signal φ2, even though this delay is considerably shorter in the case shown. In spite of the fact that the delay is relatively short, this clock skew can give rise to problems when the first and second integrated circuits communicate with each other. It is therefore advantageous to attempt to reduce the clock skew between the clock signals φ1, φ2 in these two circuits whenever data is exchanged.

FIG. 4 shows the arrangement according to the invention. This arrangement enables the synchronization of each application-specific integrated circuit ASIC1, ASIC2, ASIC3 to be adapted to the common clock signal CLK. Each input of data into a first integrated circuit ASIC1 is thereby performed synchronously with the common clock signal CLK in spite of the fact that the circuit is controlled by a first clock signal φ1 which has a first clock frequency.

A switching device 5 receives the first clock signal φ1 and is actuated thereby such that it changes between a first and a second state. This change occurs for each edge of a clock pulse in the first clock signal φ1 adapted to the circuit such that the switching device 5 is in the first state for the entire clock pulse, i.e. the period of time between a positive edge and a negative edge following the latter in the first clock signal φ1.

In the first state of the switching device 5 new data is input at the input of the arrangement 4. This means that an input signal IN to the arrangement 4 is coupled unaffected through the switching device. The input signal IN shown in the Figure corresponds to a signal from for example the second integrated circuit which is controlled by the second clock signal φ2.

A storage member 6 is arranged for the intermediate storage of the input signal IN. The changes of state of the storage member 6 are controlled by the common clock signal CLK which means that input into and output from the storage member 6 occurs at a higher frequency than the input into the switching device 5. The storage member 6 receives the output signal from the switching device 5 during a first clock pulse and this signal can already be received at the output of the storage member 6 during the same clock pulse. The storage member is arranged to store the input signal until a new input occurs during a subsequent clock pulse. Consequently intermediate storage occurs during a clock cycle in the common clock signal CLK.

During an intermediate period before a nets clock pulse is received in the first clock signal φ1 it is important that the output signal OUT from the arrangement 4 to the first integrated circuit ASIC1 remains constant. The integrated circuit ASIC1 triggers on the positive edge of a clock pulse in known manner in the first clock signal φ1 and the output signal OUT of the arrangement should therefore not be changed before a new clock pulse is received in the first clock signal φ1. In order to enable an unchanged output signal to be output during a plurality of clock cycles in the common clock signal, the output signal from the storage member 6 is fed back to the switching device 5. When the switching device 5 changes to the second state, the fed-back output signal is through-connected to the storage member 6 which during the subsequent clock pulse in the common clock signal CLK, through-connects the same signal to the storage member output, which signal constitutes the output signal from the arrangement.

When a new clock pulse is received in the first clock signal, the switching device returns to the first state again and an input signal to the circuit can be fed through the switching device to the storage member. This input signal can then be fed further, by further synchronization, to the integrated circuit from the storage member.

For the second integrated circuit ASIC2 shown in FIG. 2 the frequency for the second clock signal φ2 is precisely one quarter of the frequency for the common clock signal CLK. The use of the arrangement 4 according to the invention in the second integrated circuit ASIC2 thus means that data from some other integrated circuit ASIC1, ASIC3 can be coupled through the switching device 5 during the first clock pulse in the second clock signal φ2. The output signal OUT from the arrangement 4. i.e. from the storage member 6, responds to the input signal IN as quickly as the next positive edge is detected in the common clock signal CLK. By means of this clock pulse in the second clock signal φ2 an activating pulse edge is therefore selected in the common clock signal CLK. During the following three clock pulses of the common clock signal CLK the output signal from the storage member 6 is fed back through the switching device, which means that the output signal OUT from the arrangement 4 remains unchanged during these pulses. The output signal OUT therefore remains unchanged during the total four clock pulses from the common clock signal CLK. A new input signal IN is input into the switching device 5 when a clock pulse is again received from the other clock signal φ2. This new input signal IN is processed as indicated above.

The arrangement according to the invention and shown in FIG. 4 is arranged for connection to an input on each of the integrated circuits ASIC1, ASIC2, ASIC3 which are arranged to communicate with one other. By means of the arrangement 4 according to the invention a clock signal adapted to the circuit is synchronized with a clock signal CLK which is common to all the communicating integrated circuits ASIC1, ASIC2, ASIC3. The output signal OUT from the arrangement 4 according to the invention constitutes the input signal to the corresponding integrated circuit.

I claim:

1. Arrangement for determining a first activating pulse edge of a common clock signal wherein the first activating pulse edge enables a first edge-triggered integrated circuit to communicate with at least a second edge-triggered integrated circuit, comprising:

a switching device which is arranged to receive frequency data in the form of a first clock signal which is applied to the first integrated circuit and has a lower frequency than the frequency of the common clock signal; and a storage member, which is edge-triggered by the common clock signal and is arranged to receive an output signal from the switching device and to provide an output signal from the arrangement to the first edge-triggered integrated circuit; wherein the switching device is arranged to change between a first state and a second state by changing its state dependent on the first clock signal, wherein, in the first state, an input signal from the at least second integrated circuit is through-connected to the storage member and, the second state, the output signal from the storage member is fed back to the storage member.

2. Arrangement according to claim 1, wherein the storage member is arranged to trigger on a positive edge of the common clock signal.

3. Arrangement according to claim 1, wherein the switching device is arranged to change state on both positive and negative edges of the first clock signal.

4. Method for determining a first activating pulse edge of a common clock signal wherein the first activating pulse edge enables a first edge-triggered integrated circuit to receive an input signal from at least one second edge-triggered integrated circuit, comprising the steps of:

receiving frequency data, in the form of a first clock signal which is applied to the first integrated circuit and which has a lower frequency than the frequency of the common clock signal, in a switching device;

receiving the input signal in the switching device;

actuating the switching device such that it changes between a first and a second state, based on the first clock signal;

when the switching device is in the first state, feeding the input signal through the switching device to a storage member edge-triggered by the common clock signal; and when the switching device is in the second state, feeding back an output signal from the storage member through the switching device to the storage member; wherein the output signal from the storage member is provided to the first edge-triggered integrated circuit.

\* \* \* \* \*